United States Patent
Gics

[19]

[11] Patent Number: 5,997,927
[45] Date of Patent: Dec. 7, 1999

[54] INDICATOR, AN ASSOCIATED PACKAGE AND ASSOCIATED METHODS

[75] Inventor: Paul W. Gics, Sewickley Heights, Pa.

[73] Assignee: Gics & Vermee, L.P., Sewickley, Pa.

[21] Appl. No.: 08/819,906

[22] Filed: Mar. 18, 1997

[51] Int. Cl.$^6$ ............................................. C01K 3/04
[52] U.S. Cl. ........................... 426/383; 426/87; 426/88; 426/106; 426/231; 426/232; 426/392; 116/207; 116/216; 116/219; 53/507; 264/132; 283/81; 283/114; 374/102; 374/161; 374/162
[58] Field of Search ................................ 426/87, 88, 106, 426/231, 232, 383, 392; 374/161, 162, 102, 106, 150; 116/207, 216, 219; 427/256, 288; 156/277; 264/132; 53/507, 508; 283/81, 100, 101, 114

[56] References Cited

U.S. PATENT DOCUMENTS

| | | | |
|---|---|---|---|
| 3,344,670 | 10/1967 | Olsen et al. | 374/102 |
| 3,942,467 | 3/1976 | Witonsky | 426/88 X |
| 3,946,611 | 3/1976 | Larsson | 426/88 X |
| 3,999,946 | 12/1976 | Patel et al. | 426/88 X |
| 4,156,365 | 5/1979 | Heinmets et al. | 374/162 |
| 4,212,153 | 7/1980 | Kydonieus et al. | 116/216 X |
| 4,276,190 | 6/1981 | Patel | 426/88 X |
| 4,382,700 | 5/1983 | Youngren | 426/88 X |
| 4,389,217 | 6/1983 | Baughman et al. | 426/88 X |
| 4,428,321 | 1/1984 | Arens | 426/88 X |
| 4,432,656 | 2/1984 | Allmendinger | 426/88 X |
| 4,538,926 | 9/1985 | Chretien | 426/88 X |
| 4,859,360 | 8/1989 | Suzuki et al. | 374/162 X |
| 5,153,036 | 10/1992 | Sugisawa et al. | 426/88 X |
| 5,267,794 | 12/1993 | Holzer | 426/88 X |
| 5,302,028 | 4/1994 | Carey | 374/162 X |
| 5,460,117 | 10/1995 | Loustaunau | 426/88 X |
| 5,482,373 | 1/1996 | Hutchinson | 374/162 X |
| 5,490,476 | 2/1996 | Veitch et al. | 426/88 X |
| 5,492,703 | 2/1996 | Gics | 426/87 |
| 5,667,303 | 9/1997 | Arens et al. | 374/102 |
| 5,709,472 | 1/1998 | Prusik et al. | 374/106 |
| 5,738,442 | 4/1998 | Paron et al. | 374/162 |

*Primary Examiner*—Milton Cano
*Attorney, Agent, or Firm*—David V. Radack; Eckert Seamans Cherin & Mellott, LLC

[57] ABSTRACT

An indicator including an indicator product that is adapted to change visual appearance, an indicator scale in near adjacency to the indicator product including substantially all of the visual appearances that the indicator product can display and a binary scale in near adjacency with the indicator product and the indicator scale. A package adapted to contain a product is also disclosed including a container for holding the product with an indicator secured to the container. Associated methods of (i) determining whether a product in a package is acceptable; (ii) packaging a product; and (iii) making an indicator label are also disclosed.

35 Claims, 4 Drawing Sheets

INDICATOR, AN ASSOCIATED PACKAGE AND ASSOCIATED METHODS

BACKGROUND OF THE INVENTION

This invention relates to an indicator, an associated package and associated methods.

Indicators useful for telling whether a product (such as a food product) has been exposed to high temperature or undesirably long shelf time or both are known. See, U.S. Pat. No. 3,999,946. Generally, these indicators involve providing a label that changes colors in order to indicate these undesirable occurrences. The label color then is matched to a chart or a table that shows the different possible colors. The color of the label is compared to a complementary color on the chart to see if the product is acceptable.

U.S. Pat. No. 4,538,926 shows a temperature indicator for use with wine in which the indicator is adjacent to a scale having red and violet colors. The scale acts as a thermometer, telling the user whether the environmental temperature is too hot or too cold for the wine.

Despite the availability of these products, there is still a need for an easy to use indicator that gives the consumer a clear acceptable/unacceptable indication of the freshness or suitability of products contained in a package. The indicator should also remove all "guess-work" or judgment from the consumer with regard to whether the product contained in the package is acceptable or not.

SUMMARY OF THE INVENTION

The invention has met the above-mentioned needs as well as others. The indicator of the invention comprises an indicator means that is adapted to change visual appearance, an indicator scale in near adjacency to the indicator means including substantially all of the visual appearances that the indicator means can display and a binary scale in near adjacency with the indicator means and the indicator scale. The binary scale includes a first zone and a second zone. The visual appearance of the indicator means is matched to a visual appearance on the indicator scale to create a matched area. The matched area is aligned in either the first zone or the second zone. In one embodiment, the first zone can be green in color (indicating an acceptable product) or can be red in color (indicating an unacceptable product). The consumer simply locates the matched area and determines in which zone it falls to determine whether the product is acceptable or not.

A package is also disclosed including a container for holding a product, the container having disposed thereon an indicator, as disclosed above. In a further embodiment, the indicator scale and binary scale can be preprinted on the container and the indicator means can be subsequently placed on the container. Associated methods of (i) determining whether a product in a package is acceptable; (ii) packaging a product; and (iii) making an indicator label are also disclosed.

BRIEF DESCRIPTION OF THE DRAWINGS

A full understanding of the invention can be gained from the following description of the preferred embodiment when read in conjunction with the accompanying drawings in which.

DETAILED DESCRIPTION

Figure 1:
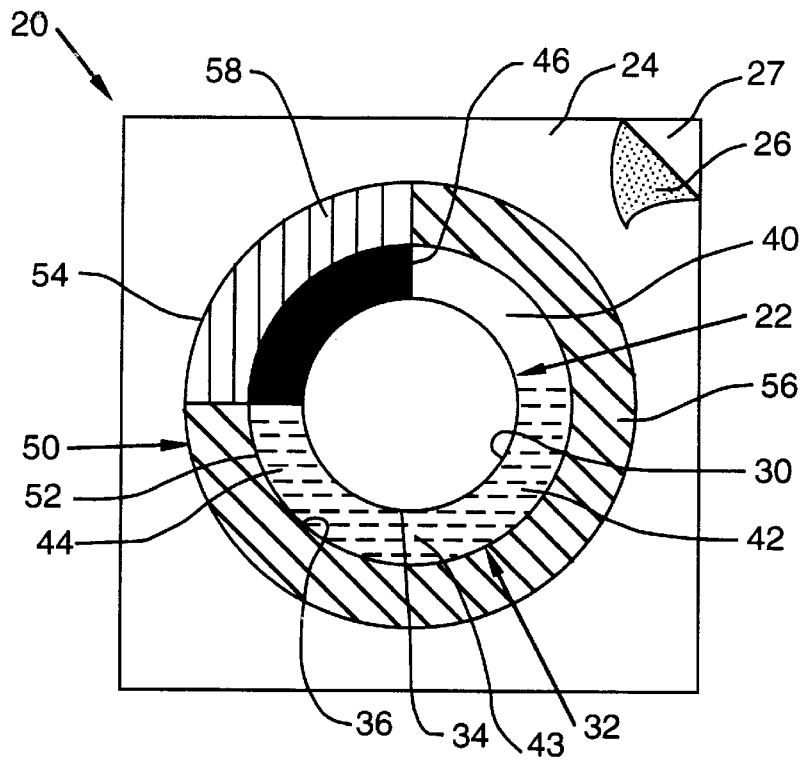
FIG. 1 is a plan view of an embodiment of the indicator of the invention.

Referring now to FIG. 1, an indicator 20 made in accordance with the invention is shown. The indicator 20 consists of a central and circular shaped indicator means 22 which is disposed on a label 24. The label 24 preferably has an adhesive backing 26 for facilitating adhesively securing the indicator 20 to a container as will be discussed below. A release layer 27 is provided in order to protect the adhesive backing 26 before placement onto the container. The indicator means 22 itself can be any of a number of indicator means that is adapted to change visual appearance. For example, one type of indicator means can change visual appearance when subjected to one or more environmental stimuli, such as excessive temperature. A specific example of such an indicator is disclosed in U.S. Pat. No. 3,999,946 (the disclosure of which is incorporated by reference) and is shown in FIG. 1. This indicator means 22 changes color when exposed to an undesirable time-temperature history. A time/temperature indicator ("TTI") that is commercially available is sold under the trademark "LIFELINES" by Lifeline, Inc. of New Jersey (U.S.A.).

Although the indicator means 22 shown in FIG. 1 changes color, the invention encompasses any indicator means that changes visual appearance. Furthermore, as used herein, the term "color" includes achromatic colors, such as white, gray and black, along with the distinct colors of the spectrum (red, orange, yellow, green, blue, indigo and violet). In fact, the embodiment shown in FIG. 1 (and the LIFELINES product) changes sequentially and irreversibly from white to light gray to medium gray to dark gray and finally to black upon exposure to undesirable time/temperature histories.

Returning now to FIG. 1, the indicator means 22 is generally circular in shape and includes an outer circular perimeter 30. An indicator scale 32 substantially surrounds the indicator means 22. The indicator scale 32 is substantially ring shaped and includes (i) an inner circular perimeter 34 disposed adjacent the outer circular perimeter 30 of the indicator means 22 and (ii) an outer circular perimeter 36.

The indicator scale 32 has several different colored regions which include substantially all of the various colors (i.e., white, all shades of gray and black) that the indicator means 22 can display. The indicator scale 32, which is shown in this embodiment as a tonal scale, starts at the twelve o'clock position with an all white region 40 and proceeds clockwise to darken from a light gray region 42 eventually darkening to a medium gray region 43 and then to a dark gray region 44 and then finally to a black region 46. Due to the limitations of patent drawings, regions 42, 43 and 44 are shown as being one achromatic color (i.e., gray) on FIGS. 1–6, however the preferred embodiment is as stated above, i.e., a region between the white region 40 and black region 46 that starts as a light gray color region 42 and darkens to a medium gray color 43 and then a dark gray color 44. It will be appreciated that a smooth transition from white to gray to black in indicator scale 32 is provided in FIG. 1, although it will be appreciated that distinct and separate regions can be employed.

Substantially surrounding the indicator scale 32 is a binary scale 50. The binary scale 50 has a generally ringed shape and includes (i) an inner circular perimeter 52 disposed adjacent to the outer circular perimeter 36 of the indicator scale 32 and (ii) an outer circular perimeter 54. The binary scale 50 includes a first zone 56 and a second zone 58. As shown in FIG. 1, the first zone 56 is colored green and the second zone 58 is colored red. Alternatively, the first zone 56 could just include the word "good" and the second zone 58 could just include the word "bad". Finally, both the colors (i) green and red and (ii) the words "good" and "bad" could be used. It will be appreciated that the idea of the invention is to provide a binary scale having two distinct regions (i.e., acceptable/not acceptable) that can be easily observed by a user to determine easily whether a product is acceptable or not acceptable. The significance of the zones will be discussed below.

Figure 2:
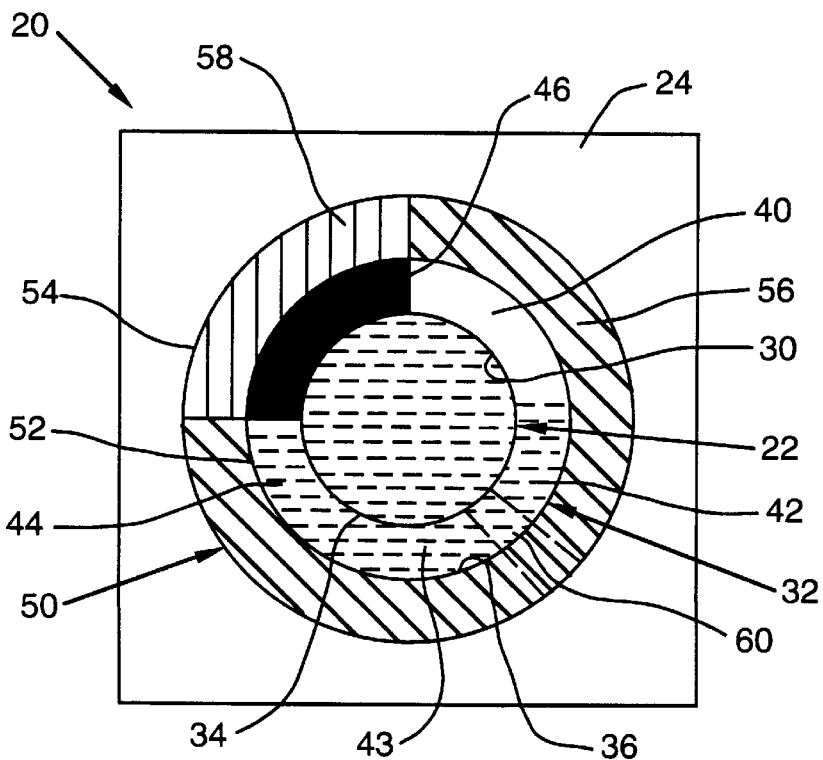
FIG. 2 shows the indicator after being exposed to acceptable levels of environmental stimulus.
Figure 3:
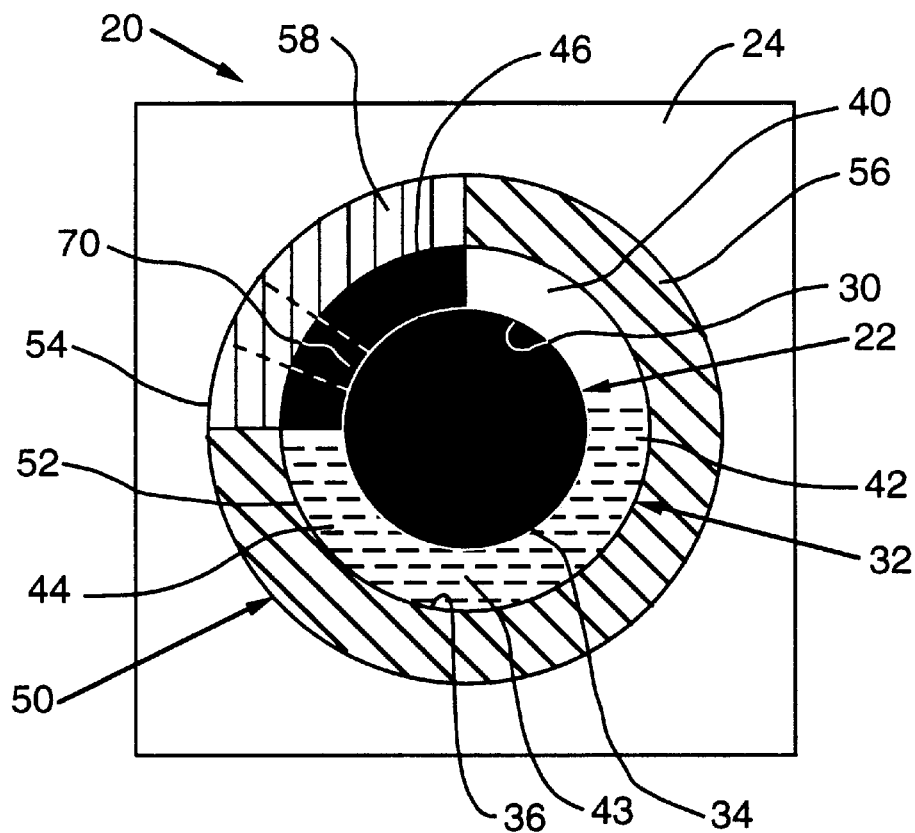
FIG. 3 shows the indicator after being exposed to unacceptable levels of environmental stimulus.

Referring now to FIGS. 1–3, the use of the indicator 20 will be discussed. Once the indicator 20 is secured to a package, and the indicator 20 is subjected to an environmental stimulus the indicator means 22 (a TTI) will start to turn gray. For example, referring to FIG. 2, the indicator means 22 has been subjected to a minor time or temperature or both time and temperature stimulus. The indicator means 22 has turned a shade of gray, namely a light gray. Again, due to the limitations of patent drawings, the indicator means 22 is shown as being just gray, however, for purposes of this discussion, the color of the indicator means 22 in FIG. 2 is light gray to match a portion of the light gray region 42 of the indicator scale 32. FIG. 3 shows the indicator means 22, perhaps at a later time, which has turned to black. In accordance with the invention, the color of the indicator means 22 is matched to the complementary color on the indicator scale 32. This creates a matched area, such as matched area 60 on FIG. 2 and matched area 70 on FIG. 3. The matched area is then aligned in either the first zone 56 or the second zone 58. In FIG. 2, matched area 60 is aligned in the first zone 56, indicating that the product is acceptable. In FIG. 3, matched area 70 is aligned in the second zone 58, indicating that the product is unacceptable.

It will be appreciated that although the embodiment shown in FIGS. 1–3 shows the indicator means 22 adjacent to and surrounded by the indicator scale 32 and the binary scale 50, in turn, adjacent to and surrounding the indicator scale 32, the invention is not limited to this arrangement. The separate components are, broadly, to be positioned in "near adjacency" to each other so that the requisite comparison and matching can be easily made by a user's eye. At a minimum, this means that they should all be present on a single package. More preferably, they should be disposed on one, single and separate label 24. Even more preferably, however, it is important that the indicator scale 32 and indicator means 22 be adjacent to each other so that an accurate match can be made. Most preferably, however, all three components should be arranged as shown in FIG. 1.

Figure 4:
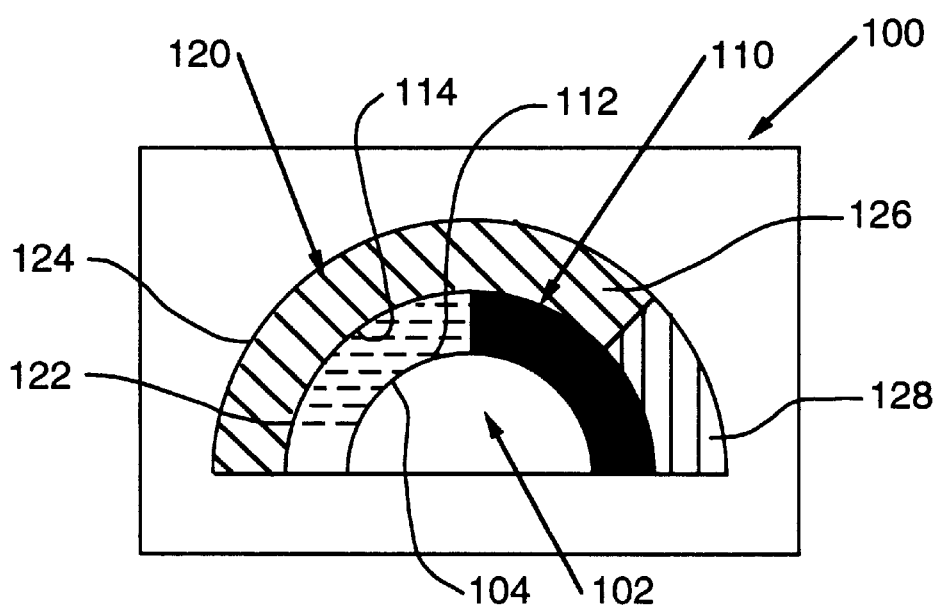
FIG. 4 is another embodiment of the indicator of the invention.

FIG. 4 shows a semi-circular embodiment of an indicator 100 in which the indicator means 102 is semi-circular in shape. Indicator means 102 includes an outer semi-circular perimeter portion 104. The indicator scale 110 has a generally half-ring shape including (i) an inner semi-circular perimeter portion 112 disposed adjacent the outer semi-circular perimeter portion 104 and (ii) an outer semi-circular perimeter portion 114. As in FIGS. 1–3, the indicator scale 110 has the same white, light gray, medium gray, dark gray and black regions. Again, due to limitations of patent drawings, only one achromatic color, i.e., gray, is shown for the various gray regions. The binary scale 120, in this embodiment, is a generally half-ring shape including (i) an inner semi-circular perimeter portion 122 disposed adjacent the outer semi-circular perimeter portion 114 of the indicator scale 110 and (ii) an outer semi-circular portion 124. The binary scale 120 includes a green zone 126 and a red zone 128. The operation and use of this embodiment is similar to the operation and use of the circular embodiment shown in FIGS. 1–3.

Figure 5:
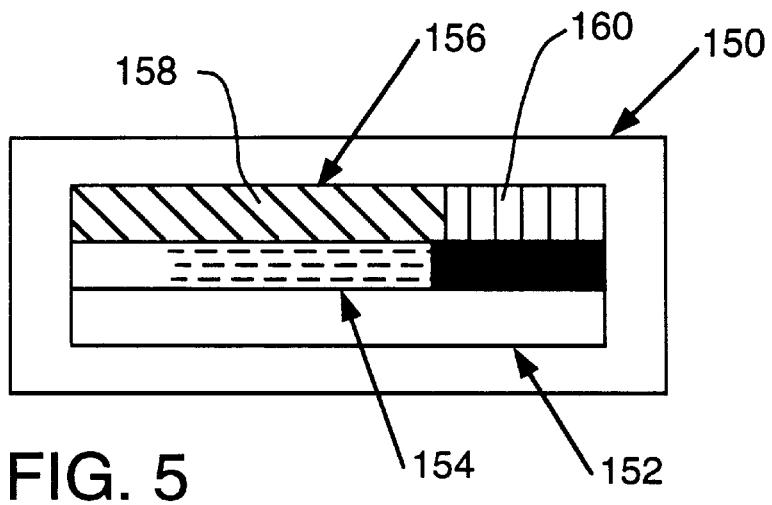
FIG. 5 is yet another embodiment of the indicator of the invention.

FIG. 5 shows a rectangular embodiment of an indicator 150 in which the indicator means 152 is rectangular in shape. Indicator scale 154 is also generally rectangular in shape and is preferably adjacent to and similar in dimension to and co-extensive with the indicator means 152. As in FIGS. 1–4, the indicator scale 154 has the same white, light gray, medium gray, dark gray and black regions. Again, due to limitations of patent drawings, only one achromatic color, i.e., gray, is shown for the various gray regions. Finally, binary scale 156 is also generally rectangular in shape and is preferably adjacent to and similar in dimension to and co-extensive with the indicator scale 154. Binary scale 156 includes a green zone 158 and a red zone 160. It is preferred that the indicator scale 154, in this embodiment, is between the binary scale 156 and indicator means 152 in order to facilitate easier comparison of the colors for the consumer, however, the invention contemplates any arrangement of the indicator means 152, indicator scale 154 and binary scale 156, so long as all are within a near adjacency to each other, i.e., so that a user's eye need not wander too much in order to make the comparison but at a minimum, the components are all on the same package. It will be appreciated that the operation and use of this rectangular embodiment is similar to the operation and use of both the circular embodiment shown in FIGS. 1–3 and the semi-circular embodiment shown in FIG. 4.

Figure 6:
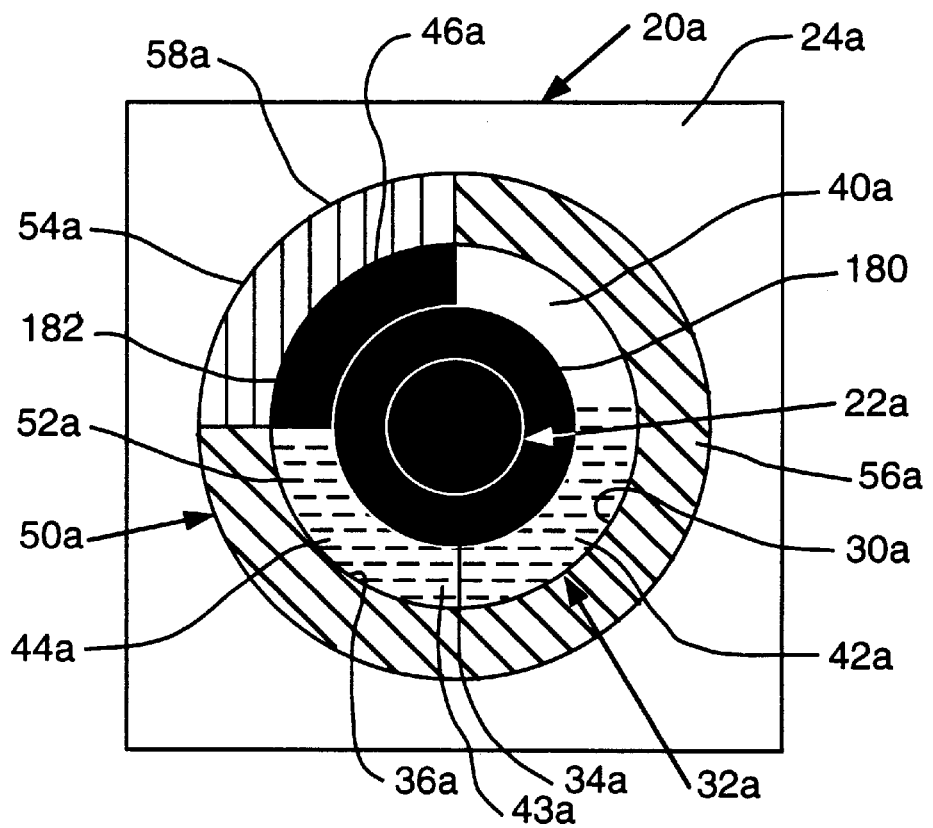
FIG. 6 shows an alternate embodiment of the circular indicator shown in FIG. 1 which includes the interposed solid color region.

FIG. 6 is yet another embodiment of the circular embodiment. In this embodiment (where like reference numbers to those used in FIGS. 1–3 are indicated by using an "a") a solid color ring 180 is interposed between the indicator means 22a and the indicator scale 32a. This solid color ring 180 matches the color of the initial portion 182 of the red zone 58a of the indicator scale 32a. In this way, an easier comparison of the minimally unacceptable color of the indicator of the indicating means 32a can be made to the indicator scale 32a.

Figure 7:
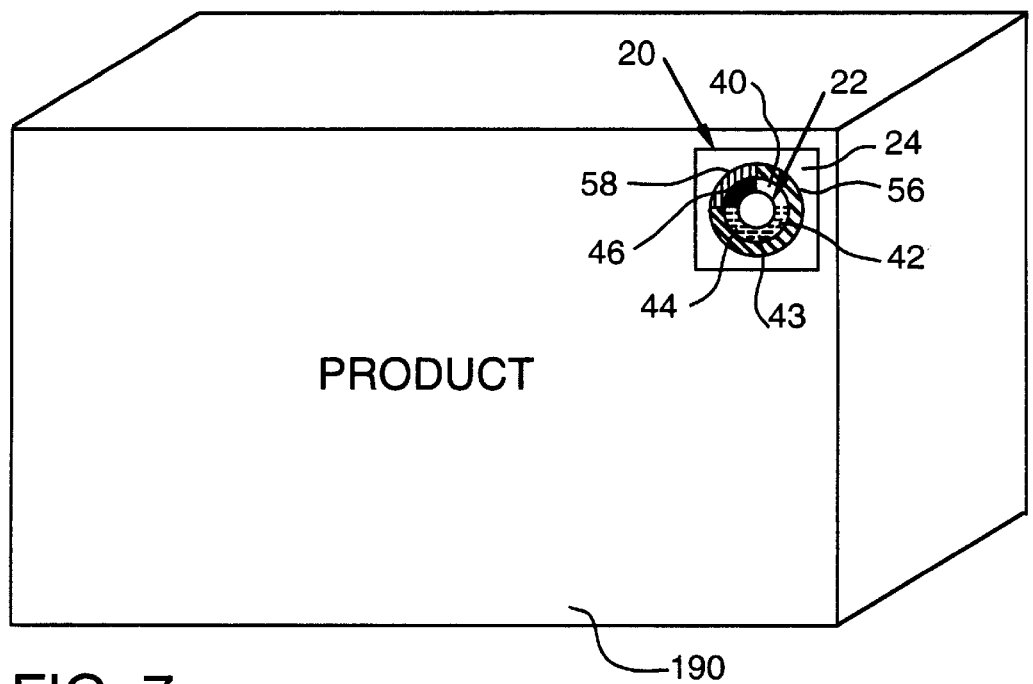
FIG. 7 is a perspective view of the package of the invention showing the indicator thereon.

FIG. 7 shows the indicator 20 used on a container 190 holding a product (not shown), the indicator 20 and container 190 forming a package. The indicator 20 should be readily and easily visually observable on the container 190 when the container 190 is presented to the consumer for sale. The package can contain any number of items whose acceptability needs to be determined by a user. For example, the container 190 could hold food products, chemicals, pharmaceuticals or medical instruments. The container can take any form or be made of any desired material. The container can also include different components, such as a tray and plastic wrap, such as are used with meat packages or could be a plastic tray and a paperboard lid (see my U.S. Pat. No. 5,492,703, the disclosure of which is incorporated by reference herein).

Figure 8:
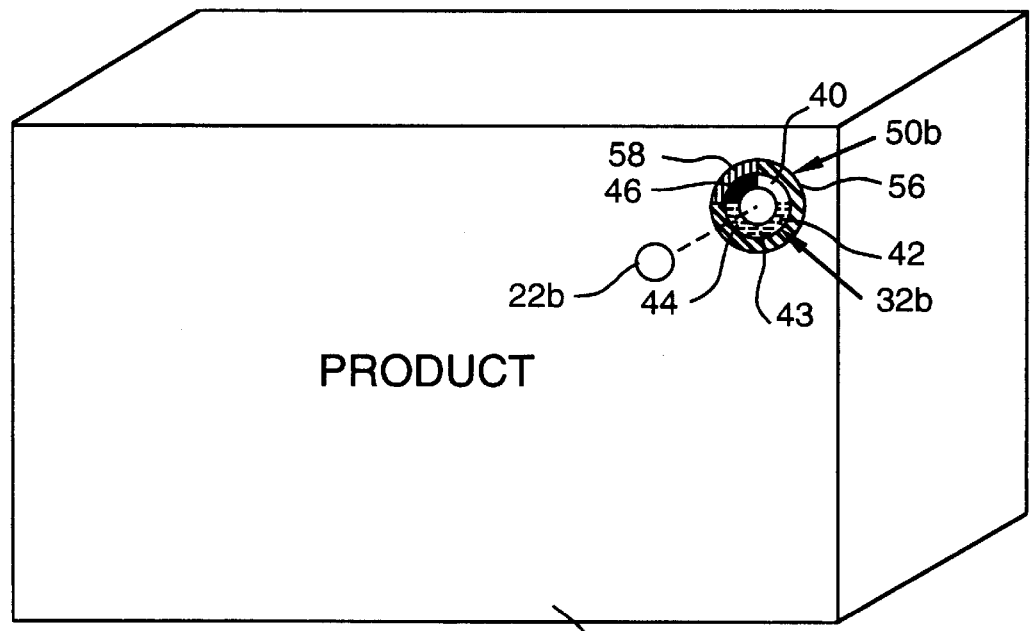
FIG. 8 is a perspective view of another embodiment of the invention showing the package having preprinted indicator scale and binary scale thereon with the indicator means being subsequently placed thereon.

An alternate embodiment of the package is shown in FIG. 8. A container 196 has preprinted thereon the indicator scale 32b and binary scale 50b. Subsequently, the indicator means 22b is placed into position as shown in FIG. 8, by, for example, providing an adhesive backing on the indicator means 22b to facilitate securement to the container 196. It will be appreciated that any combination of preprinting the indicator scale 22b and/or binary scale 50b can be used (i.e., printing only one or the other or both). The idea is that the indicator means 22b can be placed on the container 196 after the binary scale 50b and/or the indicator scale 32b is printed thereon.

The invention also provides several methods. The first is a method of determining whether a product in a package is acceptable for use. This method comprises providing a package including a container holding the product, the container having disposed thereon an indicator as described above. The method then comprises matching the visual appearance of the indicator means with a corresponding similarly visually appearing portion of the indicator scale to create a matched area and then observing the matched area and determining with which of the first or second zones the matched area is aligned so as to determine whether the product is acceptable or not. As was discussed above, the indicator can be provided as an integral unit and placed, as a whole, on the container (FIG. 7) or the container can have preprinted thereon the indicator scale and/or binary scale (FIG. 8).

Another embodiment of the invention is a method of packaging a product comprising providing a container and placing a product into the container. The method then comprises providing on the container an indicator as described above. Once again, the indicator can be provided as an integral unit and placed, as a whole, on the container (FIG. 7) or the container can have preprinted thereon the indicator scale and/or binary scale (FIG. 8).

A yet another method of the invention involves a method of making an indicator comprising providing a label, providing an indicator means and printing on the label an indicator scale and a binary scale. After this, the indicator means is placed on the label in near adjacency with the indicator scale and the binary scale.

It will be appreciated that an indicator, along with a package including a container and the indicator and associated methods are provided in order to give the user a clear acceptable/unacceptable indication on the face of the package. The invention can be easily applied to current indicator technology and will substantially enhance the value and usage of indicators.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An indicator comprising:
   a time/temperature indicator that irreversibly changes visual appearances based on a combination of predetermined times and temperatures;
   an indicator scale in near adjacency to said time/temperature indicator including substantially all of said visual appearances that said time/temperature indicator can display; and
   a binary scale in near adjacency with said time/temperature indicator and said indicator scale, said binary scale including a first zone and a second zone, whereby said visual appearances of said time/temperature indicator is matched to a visual appearance on said indicator scale to create a matched area, said matched area being aligned in either said first zone or said second zone.

2. The indicator of claim 1, wherein
   said indicator scale is positioned adjacent said time/temperature indicator.

3. The indicator of claim 2, wherein
   said binary scale is positioned adjacent said indicator scale.

4. The indicator of claim 3, wherein
   said time/temperature changes colors when subjected to an environmental stimulus; and
   said indicator scale includes all of said colors that said time/temperature indicator can display.

5. The indicator of claim 4, wherein
   said first zone is colored green and said second zone is colored red.

6. The indicator of claim 5, including
   a solid color region disposed between said time/temperature indicator and said indicator scale, said solid color aiding in matching said time/temperature indicator color with said indicator scale color, said solid color being matched with the same color in said indicator scale to create a matched area that is always in said red zone.

7. The indicator of claim 1, wherein
   said time/temperature indicator changes sequentially and irreversibly from white to gray to black when subjected to undesired temperature conditions, undesired time durations or both; and
   said indicator scale is a tonal scale that includes a white region, a gray region and a black region.

8. The indicator of claim 7, wherein
   said gray region includes a light gray color region, a medium gray color region, and a dark gray color region.

9. The indicator of claim 1, wherein
   said time/temperature indicator is generally circular in shape and includes an outer circular perimeter;
   said indicator scale has a generally ring shape that substantially surrounds said time/temperature indicator, said indicator scale including (i) an inner circular perimeter disposed adjacent said outer circular perimeter of said time/temperature indicator and (ii) an outer circular perimeter; and
   said binary scale has a generally ring shape that substantially surrounds said indicator scale, said binary scale including (x) an inner circular perimeter disposed adjacent said outer circular perimeter of said indicator scale and (y) an outer circular perimeter.

10. The indicator of claim 1, wherein
    said time/temperature indicator is substantially rectangular in shape;
    said indicator scale is generally rectangular in shape and is co-extensive with said time/temperature indicator; and
    said binary scale is generally rectangular in shape and is co-extensive with said indicator scale.

11. The indicator of claim 1, wherein
said time/temperature indicator is semi-circular in shape and includes an outer semi-circular perimeter portion;
said indicator scale has a generally half-ring shape including (i) an inner semi-circular perimeter portion disposed adjacent said outer semi-circular perimeter portion of said time/temperature indicator and (ii) an outer semi-circular perimeter portion; and
said binary scale has a generally half-ring shape including (x) an inner semi-circular perimeter portion disposed adjacent said outer semi-circular perimeter portion of said indicator scale and (y) an outer semi-circular portion.

12. The indicator of claim 1, wherein
said time/temperature indicator, said indicator scale and said binary scale are disposed on a label including an adhesive backing.

13. A package adapted to contain a product comprising:
a container for holding said product; and
an indicator disposed on said container and visually observable on said container, said indicator comprising:
  (i) a time/temperature indicator that irreversibly chances visual appearances based on a combination of predetermined times and temperatures;
  (ii) an indicator scale in near adjacency to said time/temperature indicator including substantially all of said visual appearances that said time/temperature indicator can display; and
  (iii) a binary scale in near adjacency with said time/temperature indicator and said indicator scale, said binary scale including a first zone and a second zone, whereby said visual appearances of said time/temperature indicator is matched to a visual appearance on said indicator scale to create a matched area, said matched area being aligned in either said first zone or said second zone in order to determine whether said product in said container is acceptable or not.

14. The package of claim 13, wherein
said indicator is an integral product and is secured as a single unit onto said container.

15. The package of claim 14, wherein
said time/temperature indicator, said indicator scale and said binary scale are disposed on a label having an adhesive backing wherein said label is adhesively secured to said container.

16. The package of claim 13, wherein
said binary scale and said indicator scale are printed on said container and said time/temperature indicator is secured to said container.

17. The package of claim 16, wherein
said time/temperature indicator is secured to said container after said binary scale and said indicator scale are printed on said container.

18. The package of claim 13, wherein
said product is a food product.

19. The package of claim 13, wherein
said time/temperature indicator changes sequentially and irreversibly from white to gray to black when said package is subjected to undesired temperature conditions, undesired time durations or both; and
said indicator scale is a tonal scale that includes a white region, a gray region and a black region.

20. The package of claim 19, wherein
said gray region includes a light gray color region, a medium gray color region, and a dark gray color region.

21. The package of claim 20, wherein
said first zone is colored green and said second zone is colored red.

22. The package of claim 13, wherein
said indicator scale is positioned adjacent said time/temperature indicator.

23. The package of claim 22, wherein
said binary scale is positioned adjacent said indicator scale.

24. A method of determining whether a product in a package is acceptable for use, said method comprising:
providing a package including a container holding said product, said container having disposed thereon an indicator comprising (i) a time/temperature indicator that irreversibly chances visual appearances based on a combination of predetermined times and temperatures; (ii) an indicator scale adjacent to said time/temperature indicator including substantially all of said visual appearances that said time/temperature indicator can display; and (iii) a binary scale in near adjacency with said time/temperature indicator and said indicator scale, said binary scale including a first zone representing that said product is acceptable and a second zone representing that said product is unacceptable;
matching said visual appearances of said time/temperature indicator with a corresponding similarly visually appearing portion of said indicator scale to create a matched area; and
observing said matched area and determining with which of said first or second zones said matched area is aligned so as to determine whether said product is acceptable or not.

25. The method of claim 24, including
providing said indicator as an integral unit and securing said indicator as a single unit onto said container.

26. The method of claim 25, including
adhesively securing said indicator to said container.

27. The method of claim 24, including
printing on said container said indicator scale and said binary scale; and
subsequently securing said time/temperature indicator to said container.

28. The method of claim 24, including
employing said package to hold a food product.

29. A method of packaging a product comprising:
providing a container;
placing a product in said container; and
providing on said container an indicator comprising (i) a time/temperature indicator that irreversibly changes visual appearances based on a combination of predetermined times and temperatures; (ii) an indicator scale adjacent to said time/temperature indicator including substantially all of said visual appearances that said time/temperature indicator can display; and (iii) a binary scale in near adjacency with said time/temperature indicator and said indicator scale, said binary scale including a first zone and a second zone.

30. The method of claim 29, including
providing said indicator as an integral unit and securing said indicator as a single unit onto said container.

31. The method of claim 30, including adhesively securing said indicator to said container.

32. The method of claim 29, including printing on said container said indicator scale and said binary scale; and subsequently securing said time/temperature indicator to said container.

33. The method of claim 29, including said package contains a food product contained therein.

34. A method of making an indicator comprising:

providing a label;

providing a time/temperature indicator that irreversibly changes visual appearances based on a combination of predetermined times and temperatures;

printing on said label (i) an indicator scale including substantially all of said visual appearances that said time/temperature indicator can display and (ii) a binary scale in near adjacency with said indicator with said indicator scale, said binary scale including a first zone and a second zone; and placing said time/temperature indicator on said label in near adjacency with said indicator scale and said binary scale.

35. The method of claim 34, including adhesively securing said time/temperature indicator to said label.

\* \* \* \* \*